July 12, 1966  B. W. WISEMAN, JR  3,260,445
MAGNETICALLY OPERATED CARD PUNCHING MACHINE
Filed Oct. 8, 1964  2 Sheets-Sheet 1
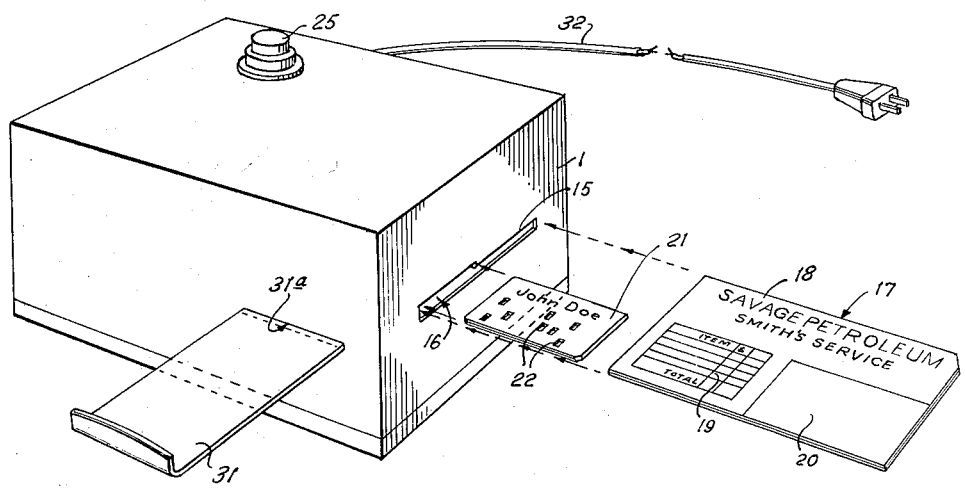
Fig. I
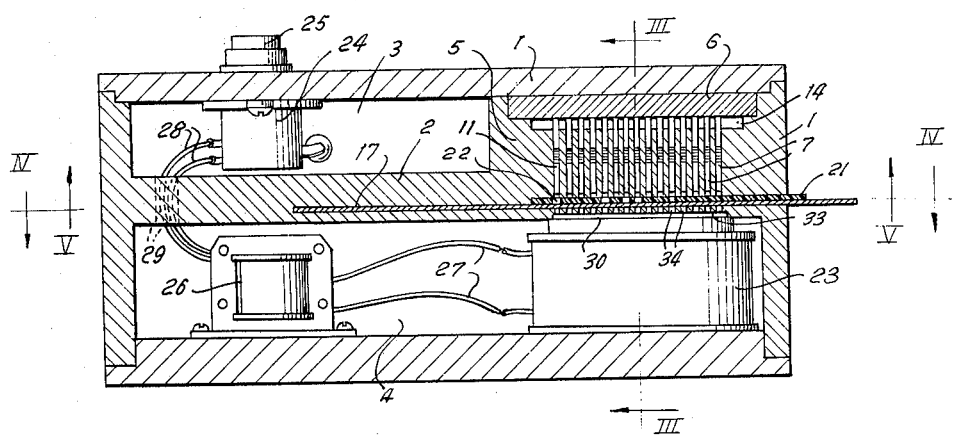
Fig. II
INVENTOR
Ben W. Wiseman, Jr.
BY *Howard E. Moore*
ATTORNEY

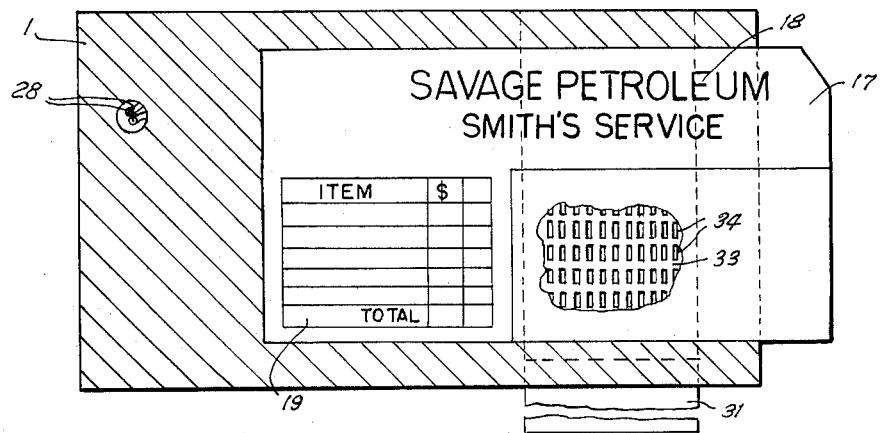
Fig. IV
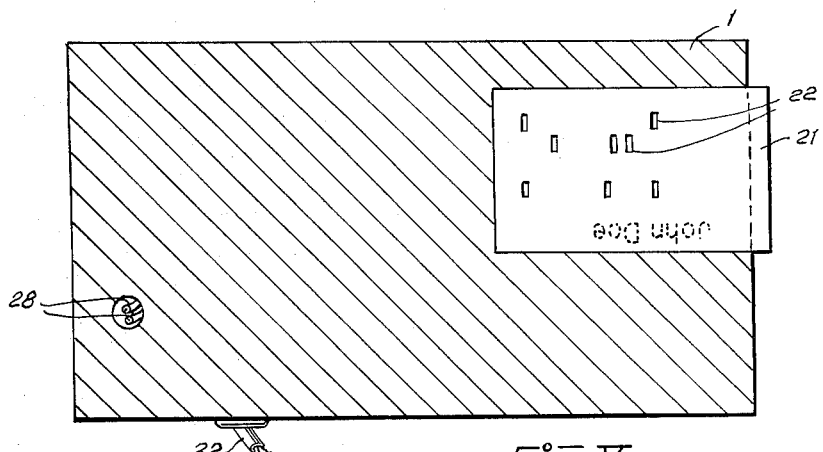
Fig. V
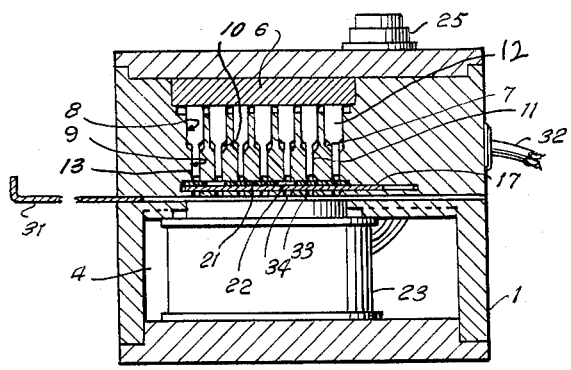
Fig. III
INVENTOR
Ben W. Wiseman, Jr.

United States Patent Office 3,260,445
Patented July 12, 1966

3,260,445
MAGNETICALLY OPERATED CARD PUNCHING MACHINE
Ben W. Wiseman, Jr., 1009 Midland National Bank, Midland, Tex.
Filed Oct. 8, 1964, Ser. No. 402,426
4 Claims. (Cl. 234—77)

This invention is concerned with improvements in a device for punching a paper or card with identification holes to correspond with holes in another card, such as a credit card, to transfer the information from the credit card to the other card or sheet.

The use of electronically controlled record storage and bookkeeping systems has become common practice in recent years. In such practice information desired to be stored and subsequently transferred to other records, is recorded on a card or sheet of paper by punching rectangular or other shaped perforations in the card at selected locations. Such information may be subsequently transferred to other records and translated into intelligible information, by passing the punched card through a recognition machine, which by the use of photoelectric cells to energize the translating equipment, transfers the information automatically to another record.

It is customary practice to record information on credit cards issued to customers by embossing the name of the customer and the selected locations of places where holes are subsequently punched in recording cards or sheets. Such information is transferred to a sales record ticket, by impressing the credit card or the like against the sales ticket, to print the embossed information on the sales ticket. Subsequently, the sales ticket is manually punched or passed through a scanning machine, which punches the recorded information on a card which may then be passed through the electronic bookkeeping equipment, to translate the information into intelligible form, or to store same.

No satisfactory means has been found by which the credit or other initial record card may be initially punched with perforations to record the desired information and from which the sales ticket may be directly punched with the said perforations at the point of purchase. The provision of such means would eliminate the necessity of passing the sales ticket or other record through a scanning device, to punch the information on a card or other record.

The present invention is intended to provide a device whereby the information pertaining to the customer or the like, may be initially recorded on the credit card or other identification card by punching holes in the card at the desired locations. The credit card thus punched may then be placed over the sales ticket and the information may be directly punched into the sales ticket from the credit card or the like, thereby eliminating the necessity of passing the sales ticket or the like through a scanning machine to punch the information on the card so that it can be transferred from such card to another record by electronic means.

The present invention comprehends a card punching device which may be employed at the point of purchase for transferring initial information from a credit or other record card to another card or sheet, such as a sales ticket by placing the perforated credit card over a sales ticket or other record to which the information is to be transferred, sliding same into a slot, and pushing a switch to energize the device to punch holes in the sales ticket corresponding to the perforations in the credit or other card.

The device is simple, easy to operate and foolproof, in that it is not necessary to operate any mechanism, such as pressure or stamping mechanism to transfer the information but once the credit card and the sales ticket are placed within the device all that is necessary to do is energize the device by pressing a switch button. There is no way in which the credit card can be damaged even though it is placed incorrectly in the machine.

The perforated credit or other record card is placed between a perforated die plate, and punch pins. The punch pins are drawn downwardly by an electro-magnet disposed underneath the die, and only the punch pins which are in alignment with perforations in the card, will go through the credit card and punch corresponding holes in the sales ticket. The punch pins which are not in alignment with holes in the die plate, will simply be stopped by the solid portion of the credit card and will not damage the credit card in any manner.

Means are provided for maintaining the punch pins in upward position by a permanent magnet, which is weaker than the electro-magnet, so that the punch pins are maintained in upward position until they are drawn downwardly by energizing the electro-magnet.

Other and further objects of the invention will become apparent upon reading the detailed specification hereinafter following and by referring to the drawings annexed hereto.

A suitable embodiment of the invention is shown in the attached drawings wherein:

FIGURE I is a perspective view of the magnetically operated card punching machine showing a credit card, and the sales ticket to which information on the credit card is to be transferred, the credit card and sales ticket being shown in expanded form;

FIGURE II is a vertical sectional view taken through FIGURE I;

FIGURE III is a vertical sectional view taken along the line III—III of FIGURE II;

FIGURE IV is a transverse sectional view taken along the line IV—IV of FIGURE II; and FIGURE V is a transverse sectional view taken along the line V—V of FIGURE II.

Numeral references are employed to designate the various parts shown in the drawings and like numerals indicate like parts throughout the various figures of the drawings.

The numeral 1 indicates a housing having a transverse partition 2 therein separating same into an upper hollow space 3 and a lower hollow space 4.

The partition 2 includes a thicker portion 5 in which is mounted a permanent magnet 6, the function of which will be hereinafter described.

A plurality of passages 7 are provided through the portion 5, each of said passages having a pin 11 slidably disposed therein. The pins 11 are made of magnetic material.

Each of the passages 7 includes an enlarged bore 8 and a smaller bore 9, providing a shoulder 10 therein. The pins 11 are of like shape as the bores. Each pin 11 has an enlarged portion 12 disposed in the enlarged bore 8, and a smaller portion 13 which extends through the smaller bore 9. The shoulders provided by the enlarged portions of the pins, engage the shoulder 10 in the bore to limit the upward movement of the pins in the respective bores.

A space 14 is provided between the permanent magnet 6 and the upper surface of the enlarged partition portion 5 through which space the pins 11 may move in contacting the permanent magnet 6.

A slot, generally indicated at 15, is provided through the wall of the housing 1, said slot having a wider portion 16.

A die plate 33 having holes 34 therein is disposed along the bottom of the slot 15. The holes 34 in the die plate 33 are arranged at the same location and in the same pattern as the pins 7 so that when the pins are brought downwardly, they will pass through the holes in the absence of an obstruction therebetween.

A customer's charge ticket is generally indicated at 17, which is preferably made of relatively stiff cardboard and would preferably include two such identical cards with a carbon therebetween, one of which may be separated from the other and given to the customer as his receipt. The customer's charge card 17 would include a company identification 18, a charge area 19 on which the identification of the purchase and the amount would be written and transferred to the card therebelow by a carbon, and would have a credit card information area 20 thereon, which would be punched in the manner hereinafter described, to transfer information pertaining to the customer to the charge card.

The credit card 21 would preferably be made of stiff plastic non-magnetic material which has perforations 22 provided therein at selected locations to be transferred to the charge card 18.

The credit card 21 is laid over the area 20 on the charge card, and the charge card and credit card are slipped into the slot 15 so that the credit card overlies the die plate 33, with the holes 22 in the credit card aligned with corresponding holes in the die plate and with punch pins 7 over said holes.

An electro-magnet 23 is mounted within the space 4 to the lower wall of the housing 1, directly underneath the die 33. A space 30 is provided between the upper surface of the electro-magnet and the die to permit the pins 7 to move downwardly sufficient to punch holes in the charge ticket 17 in the manner hereinafter described.

The electro-magnet 23 may be energized by pressing downward on the switch button 25 to close the switch 24, which in turn actuates the relay 26, to close the contacts in the relay, and supply electric current to the electro-magnet 23 to energize same.

Suitable electric leads 27 are provided between the relay 26 and the electro-magnet 23 and electric leads 28 are provided between the switch 24 and the relay 26, which leads pass through a passage 29 provided through the partition 2.

A power cord 32 is provided for plugging into a suitable source of electric power to operate the device.

The operation and function of the device hereinbefore described is as follows:

The pins 7 are normally held in upward position as shown in FIGURE II, by the permanent magnet 6.

When the credit card 21 and customer's ticket 17 are placed in the slot 15, with the credit card overlying the die 33, the switch 24 is energized by pressing on the switch button 25. This energizes the electro-magnet 23, which overcomes the force of the permanent magnet 6, and draws the punch pins 7 downwardly. The punch pins 7 which are in alignment with perforations 22 in the credit card 21, will pass through such perforations and punch corresponding holes in the ticket 17 and will pass through the corresponding holes 34 in the die 33. The pins 7, which are not aligned with a perforation 22, will engage the credit card, and will be stopped thereby, so that holes are punched in the customer's ticket only at the corresponding locations of perforations 22 in the credit card. Thereby the information represented by the perforations 22 in the credit card is transferred to the customer's ticket.

Subsequently, the customer's ticket may be passed directly into the electronic bookkeeping machine without having previously been passed through a scanner for punching, and the information punched thereon can be translated and recorded or transferred to another record.

A drawer or slide 31 slidably extends into a transverse slot 31a in the wall of the housing 1, said slide extending into the space 31, to intercept cuttings removed by punching holes in the ticket 17. The cuttings may be removed by simply withdrawing the drawer 31. Such drawer 31 is optional, it being understood that the cuttings could be removed, by providing a removable top for the housing.

It will thus be seen that I have provided a magnetically operated card punching device, which is foolproof, is simple to operate and which permits customer tickets or like bookkeeping cards to be punched directly at the point of purchase or recordation of the information from a previously punched card, thereby eliminating the necessity of scanning equipment, resulting in a great saving of time and equipment and providing for accurate transfer of information.

It will be understood that other and further embodiments of my invention may be devised without departing from the spirit and scope of the appended claims.

Having described my invention I claim:

1. In a device of the class described, a housing; a die plate disposed in the housing, having spaced perforations therethrough; a support member disposed above the die plate, having a plurality of passages therethrough corresponding to, and in alignment with, the perforations in the die plate; a plurality of punch pins made of magnetic material slidably disposed in the passages; means to normally maintain the punch pins in an upward position away from the die plate; an electro-magnet disposed below the die plate; means to energize the electro-magnet from exteriorly of the housing, the electro-magnet being of such strength when energized as to draw the punch pins downwardly through the perforations in the die plate.

2. In a device of the class described, a housing; a die plate disposed in the housing, having spaced perforations therethrough; a support member disposed above the die plate; having a plurality of passages therethrough corresponding to, and in alignment with, the perforations in the die plate; a plurality of punch pins made of magnetic material slidably disposed in the passages; a permanent magnet disposed above the punch pins arranged to normally attract them and maintain same in an upward position away from the die plate; an electro-magnet disposed below the die plate; means to energize the electro-magnet from exteriorly of the housing, the electro-magnet being of such strength when energized as to draw the punch pins downwardly through the perforations in the die plate.

3. The combination called for in claim 1 with the addition of a transverse slot in the wall of the housing between the support member and the die plate arranged to receive a superposed perforated record card and an unperforated record sheet.

4. The combination called for in claim 3 wherein the slot includes a wider portion to receive the perforated record card.

References Cited by the Examiner

UNITED STATES PATENTS 2,855,627   10/1958   Prentiss _____ 83—575 X
2,956,740   10/1960   McGregor _____ 234—94 X
3,007,630   11/1961   Jones _____ 234—77 X WILLIAM W. DYER, Jr., *Primary Examiner.*

WILLIAM S. LAWSON, *Assistant Examiner.*